US012284279B2

(12) United States Patent
Assael (10) Patent No.: US 12,284,279 B2
(45) Date of Patent: Apr. 22, 2025

(54) REDUCTION AND CONVERSION OF A SCALAR TO A τ-ADIC REPRESENTATION

(71) Applicant: STMICROELECTRONICS (ROUSSET) SAS, Rousset (FR)

(72) Inventor: Guilhem Assael, Pourrieres (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 237 days.

(21) Appl. No.: 17/981,200

(22) Filed: Nov. 4, 2022

(65) Prior Publication Data

US 2023/0155828 A1    May 18, 2023

(30) Foreign Application Priority Data

Nov. 15, 2021    (FR) ...................................... 2112052

(51) Int. Cl.
*H04L 9/30* (2006.01)
*G06F 7/72* (2006.01)

(52) U.S. Cl.
CPC ............ *H04L 9/3066* (2013.01); *G06F 7/725* (2013.01)

(58) Field of Classification Search
None
See application file for complete search history.

(56) References Cited

U.S. PATENT DOCUMENTS

| 7,079,650 | B1* | 7/2006 | Knudsen | G06F 7/725 |
| | | | | 708/492 |
| 8,422,685 | B2* | 4/2013 | Al-Somani | H04L 9/3066 |
| | | | | 380/28 |
| 11,165,577 | B2* | 11/2021 | Soukharev | H04L 9/003 |
| 2012/0008780 | A1* | 1/2012 | Al-Somani | G06F 7/725 |
| | | | | 380/255 |
| 2015/0339102 | A1* | 11/2015 | Feix | H04L 9/3066 |
| | | | | 380/28 |
| 2022/0141016 | A1* | 5/2022 | Simon | H04L 9/3066 |
| | | | | 380/44 |

(Continued)

OTHER PUBLICATIONS

Adikari et al., "A Fast Hardware Architecture for Integer to τNAF Conversion for Koblitz Curves," *IEEE Transactions on Computers* 61(5):732-737, May 2012.

(Continued)

*Primary Examiner* — Lashonda Jacobs-Burton
(74) *Attorney, Agent, or Firm* — Seed IP Law Group LLP (57) ABSTRACT

The present disclosure relates to a cryptographic method including the execution, by a cryptographic circuit, of an algorithm applied to a scalar in order to generate an output vector, of length L+n, which digits are $d_0, \ldots, d_{L+n-1}$, the algorithm comprising iterations i, each iteration i taking an input data value, initially equal to said scalar and an input vector of length c, which digits are $d'_i, \ldots, d'_{i+c-1}$, where for each $j \in \{i, \ldots, i+c-1\}$, the digit $d'_j$ is such that:

$$d'_j = \begin{cases} d_j & \text{if } j < L \\ d_{j-m} & \text{otherwise} \end{cases}.$$

38 Claims, 6 Drawing Sheets

(56) References Cited

U.S. PATENT DOCUMENTS

2023/0074513 A1    3/2023   Assael
2024/0146529 A1*  5/2024   Fan .......................... G06F 7/725

OTHER PUBLICATIONS

Brumley et al., "Conversion Algorithms and Implementations for Koblitz Curve Cryptography," *IEEE Transactions on Computers* 59(1):81-92, Jan. 2010.

Li et al., "Improved Algorithms and Implementations for Integer to τNAF Conversion for Koblitz Curves," *IEEE Transactions on Circuits and Systems—I: Regular Papers* 65(1): 154-162, Jan. 2018.

* cited by examiner

| $r_{\ell'-1}$ | ... | $r_1$ | $r_0$ | 0 | ... | 0 | $-r_{\ell'-1}$ | ... | $-r_1$ | $-r_0$ |

$\underbrace{\phantom{xx}}_{d_{\ell-1}}$ $\underbrace{\phantom{xx}}_{d_m}$ $\underbrace{\phantom{xx}}_{d_{m-1}}$ $\underbrace{\phantom{xx}}_{d_{\ell'}}$ $\underbrace{\phantom{xx}}_{d_{\ell'-1}}$ $\underbrace{\phantom{xx}}_{d_1}$ $\underbrace{\phantom{xx}}_{d_0}$ with $m$ spanning from $d_{m-1}$ to $d_m$ region.

REDUCTION AND CONVERSION OF A SCALAR TO A τ-ADIC REPRESENTATION

BACKGROUND

Technical Field

The present disclosure relates generally to the domain of cryptography and in particular to a method and device for implementing a cryptography operation based on elliptic curve cryptography.

Description of the Related Art

Elliptic curve cryptography (ECC) is well adapted to public key cryptography methods since it enables a cryptographic key of decreased size to be used. For example, elliptic curve cryptography can be used to implement an encryption, key-exchange, key-agreement, digital signature or authentication operation.

Furthermore, the use of a Koblitz curve enables the speed of some cryptographic operations, in particular the multiplication of a point by a scalar, to be increased. However, to be efficient, the scalar should generally be converted to a particular representation before being used in cryptographic operations on Koblitz curve.

It would be desirable to make the process of conversion faster and/or to render the value of the scalar difficult to detect during the execution, by an electronic device, of cryptographic operations involving it.

BRIEF SUMMARY

In an embodiment, a method comprises performing a cryptographic operation, and protecting the performing of the cryptographic operation. The performing the cryptographic operation and the protecting including execution, by a cryptographic circuit, of an algorithm applied to a scalar to generate an output vector, of length l+n, having digits $d_0, \ldots, d_{l+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise,} \end{cases}$$

where m, l and n are positive integers and each iteration i comprises:
a) calculating a first intermediate data value (u) by a first operation applied, modulo τ, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d_i$) at position i of the output vector equal to the first intermediate data value (u),
wherein the number of iterations is determined by the cryptographic circuit based on a stop criterion.

In an embodiment, a non-transitory computer readable medium's contents cause a cryptographic circuit to perform a method, the method comprising: performing a cryptographic operation; and protecting the performing of the cryptographic operation. The performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise,} \end{cases}$$

where m, l and n are positive integers and each iteration i comprises:
a) calculating a first intermediate data value (u) by a first operation applied, modulo τ, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d_i$) at position i of the output vector equal to the first intermediate data value (u),
wherein the number of iterations is determined by the cryptographic circuit based on a stop criterion.

In an embodiment, a device comprises a memory and cryptographic circuitry coupled to the memory. The cryptographic circuitry, in operation, performs a cryptographic operation and protects the performing of the cryptographic operation, the performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise,} \end{cases}$$

where m, l and n are positive integers and each iteration i comprises:
a) calculating a first intermediate data value (u) by a first operation applied, modulo τ, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d_i$) at position i of the output vector equal to the first intermediate data value (u),
wherein the number of iterations is determined by the cryptographic circuit based on a stop criterion.

In an embodiment, a system comprises a host processor and cryptographic circuitry coupled to the host processor. The cryptographic circuitry, in operation, performs a cryptographic operation and protects the performing of the cryptographic operation, the performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise,} \end{cases}$$

where m, l and n are positive integers and each iteration i comprises:
a) calculating a first intermediate data value (u) by a first operation applied, modulo τ, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d_i$) at position i of the output vector equal to the first intermediate data value (u), wherein the number of iterations is determined by the cryptographic circuit based on a stop criterion.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties, unless the context indicates otherwise.

For the sake of clarity, only the operations and elements that are useful for an understanding of the embodiments described herein have been illustrated and described in detail. In particular, the cryptographic operation of multiplication of a point on an elliptic curve by a scalar (scalar multiplication), the properties of Koblitz curves, and various choices of scalar representations are not described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical,", etc., reference is made to the orientation shown in the figures.

Unless specified otherwise, the expressions "around," "approximately," "substantially" and "in the order of" signify within 10%, and within 5%, etc.

Figure 1:
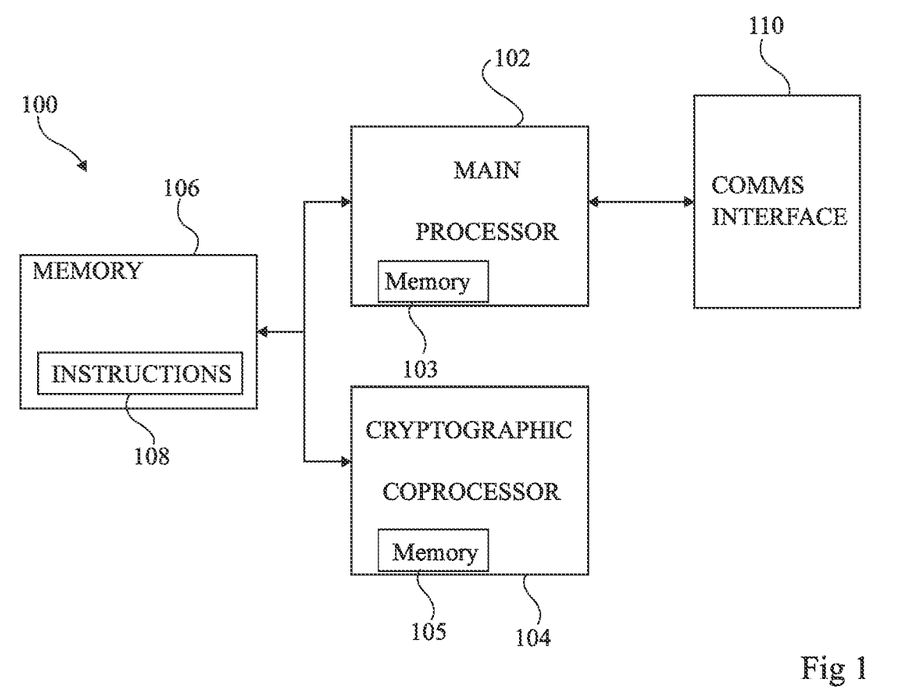
FIG. 1 schematically illustrates an example of an electronic device according to an embodiment of the present disclosure.

FIG. 1 schematically illustrates a device 100 according to an embodiment. Device 100 is for example a computer, mobile telephone, or an integrated circuit card.

Device 100 for example comprises a main processor 102 (MAIN PROCESSOR), which is for example a host processor of device 100, and a cryptographic coprocessor 104 (CRYPTOGRAPHIC COPROCESSOR). Device 100 further comprises a memory 106 (MEMORY) storing instructions 108 (INSTRUCTIONS) for controlling the main processor 102 and/or the cryptographic coprocessor 104. A communication interface 110 (COMMUNICATIONS INTERFACE) is for example coupled to the main processor 102, and for example allows wireless communications, for example, over a LAN ("Local Area Network," not shown). As illustrated, host processor 102 and cryptographic coprocessor 104 have respective internal memories 103, 105, such as registers or cache memories, which may be used during the performance one or more of the methods described herein, alone or in combination with the memory 106. For example, an application executing on the main or host processor 102 may be stored in whole or part in memory 103. The application may initiate the performance of a cryptographic operation on the cryptographic processor 104, and the cryptographic operation may be performed using the memory 105, or combinations of the memory 106 and the memory 105.

Device 100, and particularly cryptographic coprocessor 104, is for example adapted to perform elliptic curve cryptographic operations. In particular, cryptographic coprocessor 104 is for example configured to perform a multiplication by a scalar k of a point P belonging to a Koblitz curve E having the following form:

$$E := \{(x,y) \in K \times K : y^2 + xy = x^3 + ax^2 + 1\} \quad \text{Math 1}$$

with $a \in \{0, 1\}$ and where K is a binary finite field of the form $K = GF(2^m)$, where m is a prime number.

The operation of multiplication by a scalar is for example used during the ciphering of data, scalar k being the cipher key, and is for example performed by execution of an algorithm of "double-and-add type" or a variant thereof, such as "double-and-add-or-subtract" and generalizations to windowed multiplication. In the "double-and-add-or-subtract" algorithm, the digits of the scalar k can take values 1, −1 or 0. A "double" operation is done on the accumulator for each digit, and for each nonzero digit, point P is added to the accumulator when the digit is 1, or subtracted from the accumulator when the digit is −1. In a windowed multiplication, digits belong to a larger set of values, and the scalar multiplication is performed similarly to double-and-add-or-subtract, except that each addition or subtraction involves, instead of P, a small pre-computed multiple of P, which depends on the value of the digit. This type of algorithm is of iterative type. Each iteration for example involves modifying the value of an elliptic curve point called the accumulator, depending on the digits of scalar k. In one example, the digits of the scalar k are bits, and each iteration involves processing a corresponding one of the bits of scalar k from the most significant bit to the least significant bit, or inversely, by performing an operation on the point according to the value of the read bit. In the left-to-right double-and-add multiplication method, in other words double-and-add multiplication performed starting with the most significant digit and going towards the least significant digit, a so-called double operation is performed on the accumulator, whatever the value of the bit that is read, and is followed by a so-called add operation adding P into the accumulator only in the case where the read bit is non-null.

In the case of a Koblitz curve, the double operation is generally replaced with a Frobenius operation, that consists in squaring the coordinates of a point. A Frobenius operation has the advantage over a regular double operation in that it is faster and less expensive to execute.

However, to use the Frobenius operation, the scalar k should be converted to a τ-adic representation, where τ is a complex number equal to $(\mu-i\sqrt{7})/2$, where μ is equal to $(-1)^{1-a}$, and a is the coefficient of the Koblitz curve E above. In the τ-adic representation, the scalar k is represented as a sequence of digits $d_i$ such that:

$$k = \sum_{i=0}^{M-1} d_i \tau^i, \quad \text{Math 2}$$

where the coefficients $d_i$ belong for example to {0, 1} or to {−1, 0, 1}. The integer M is the length of the scalar k under τ-adic form. Scalar k can either be an integer, or a so-called τ-adic integer of the form a+bτ where a and b are integers. A difficulty is that the τ-adic representation of an integer is about twice as long as its binary form. As long representations are less efficient, scalar k is generally reduced before being converted into the τ-adic form. The reduction of the scalar k comprises replacing k by a smaller complex number ρ that is equivalent to the scalar k modulo $\tau^m-1$, where, as mentioned above, m defines through $K=GF(2^m)$ the finite field K underlying the Koblitz curve. Then, for any point P of the considered Koblitz curve, kP=ρP, where the multiplication of P by a complex number τ is defined by applying the Frobenius endomorphism to the point P.

A drawback of existing methods for performing the reduction, and τ-adic conversion, of the scalar k is that they tend to be relatively complex and time consuming. Moreover, in certain cases, when the size of the scalar k is relatively high, there is a need to perform several reduction operations before the conversion operation if a short representation is needed.

In the present disclosure, the following symbols are defined:
- k is the scalar to be converted, that may either be an integer or a τ-adic integer; and
- n is a non-negative integer.

According to embodiments described herein, the scalar k is converted into the τ-adic representation composed of the group of digits $(d_0, \ldots, d_{m+n-1})$ where each digit belongs to a set D and possibly according to a predicate or relationship $C(d_i, \ldots, d_{i+c-1})$ that holds for groups of c consecutive digits after the end of the conversion.

According to some embodiments, the scalar k is converted to τ-adic non-adjacent form (τNAF), in which the digits belong to D={−1,0,1} and in which c=2 and the product of two consecutive digits is equal to zero. In other words, $C(d_i, d_{i+1}) \Leftrightarrow (d_i \times d_{i+1}) = 0$. In that case, the τ-adic conversion can be accomplished, for example, with n=4.

Figure 2:
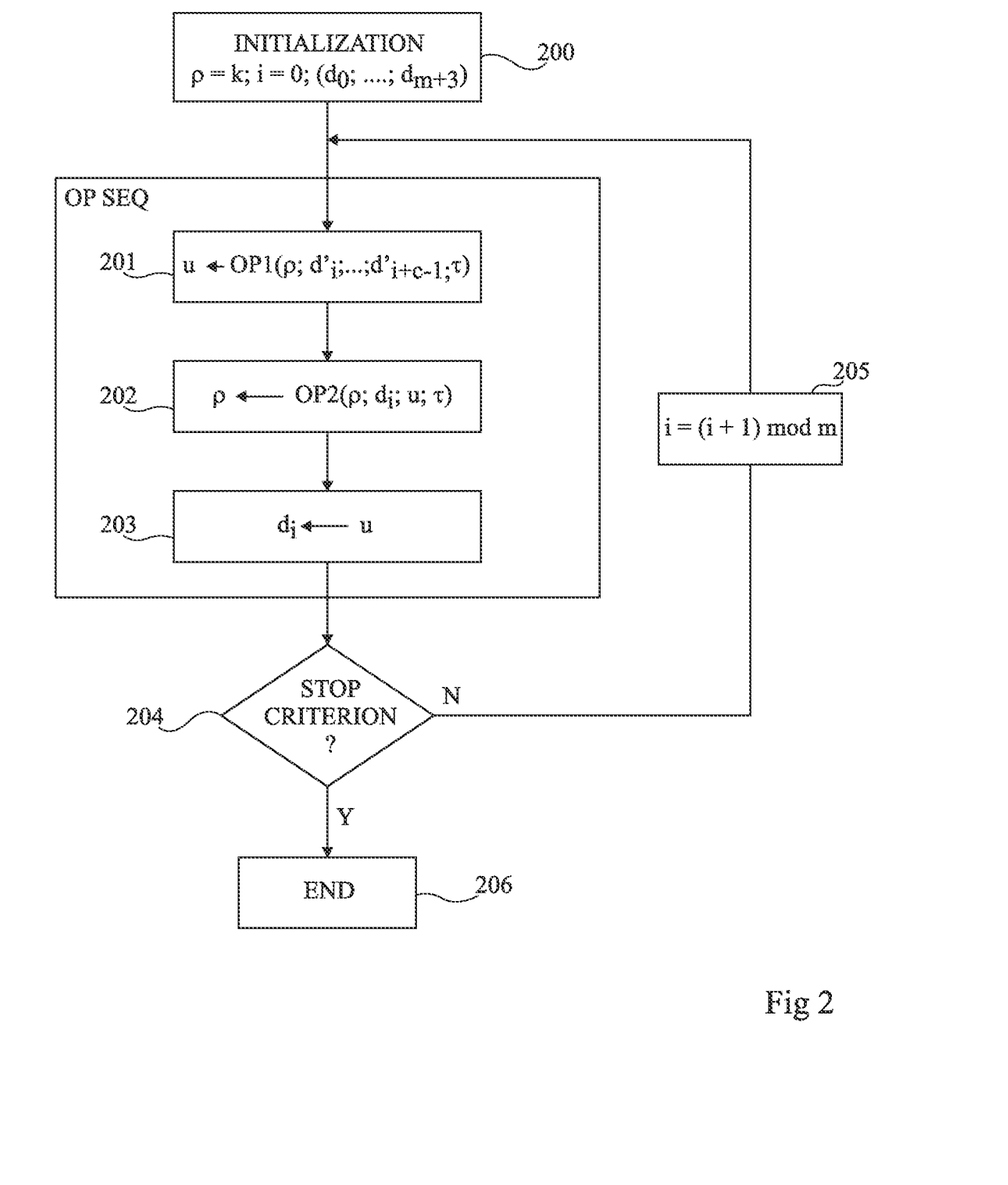
FIG. 2 is a flow diagram illustrating operations of a method of performing scalar conversion according to an embodiment.

FIG. 2 is a flowchart illustrating operations of a method of scalar reduction and conversion according to an embodiment. The method of FIG. 2 is for example implemented by the cryptographic coprocessor 104 of the electronic device 100. For example, the method of FIG. 2 is used as one step in a method of elliptic curve cryptography such as an encryption, key-exchange, key-agreement, digital signature or authentication operation.

In an operation 200 (INITIALIZATION ρ=k; i=0; $(d_0, \ldots, d_{m+n-1})$) a current value i is initialized, for example to zero. A vector $(d_0, \ldots, d_{m+n-1})$ of length m+n, is also for example initialized.

Figure 3:
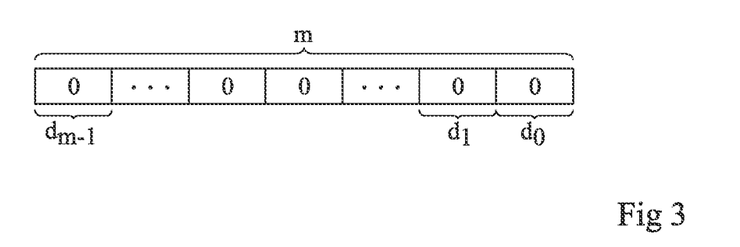
FIG. 3 illustrates an example of an initial state of an l-digit value used in the method of FIG. 2.

FIG. 3 illustrates an example of the initialization of the accumulator $(d_0, \ldots, d_{m+n})$. In this example, all coefficients $(d_0, \ldots, d_{m+n-1})$ are initialized at zero.

In FIG. 3, only the m first coefficients $(d_0, \ldots, d_{m-1})$ of the accumulator are represented. The n last coefficients $(d_m, \ldots, d_{m+n-1})$ of the accumulator are for example initialized to zero and are only updated at the end of the algorithm of FIG. 2. Indeed, the n last coefficients $(d_m, \ldots, d_{m+n-1})$ are not provided as input data values in the iterations of the algorithm.

Returning to FIG. 2, the operation 200 for example further comprises the initialization of a current value ρ to zero.

The process for example continues with a sequence of operations (OP SEQ) composed, for example, of operations 201 to 203, after operation 200.

In the operation 201 ($u \leftarrow OP1(\rho; d'_i; \ldots ; d'_{i+c-1}; \tau)$), an intermediate value u is computed as a function of the input data values and of the complex number τ according to:

$$u = (\rho + d'_i) \bmod_{d'_{i+1}; \ldots ; d'_{i+c-1}}(\tau), \quad \text{Math 3}$$

where mod returns a valid digit u belonging to set D, such that $\rho+d'_i-u$ is divisible by τ. The subscript to mod indicates that the exact choice of u may depend on digits $d'_{i+1}$ to $d'_{i+c-1}$. Each digit $d'_i$ corresponds to a cyclic indexation of the m lower digits of the accumulator $(d_0, \ldots, d_{m+n-1})$. In other words, if the index i is lower than m, then $d'_i=d_i$, otherwise $d'_i=d_{i-m}$. For example, to obtain a τNAF representation, $$\bmod_{d'_{i+1}}$$

τ is defined as follows for all τ-adic integers represented as a+bτ, where a and b are integers:

$$(a+b\tau) \bmod_{d'_{i+1}} \tau = \begin{cases} 0 & \text{if } a \equiv 0 \pmod 2 \\ 1 & \text{if } a + 2(b+d'_{i+1}) \equiv 1 \pmod 4 \\ -1 & \text{otherwise} \end{cases} \quad \text{Math 4}$$

In other words, the intermediate value u is for example equal to a remainder in the Euclidean division of $(\rho+d_i)$ by the complex number τ. This remainder is not necessarily minimal and the choice of the exact remainder for example depends on the rest of the vector $(d'_{i+1}, \ldots, d'_{i+c-1})$.

In the operation 202 ($\rho \leftarrow OP2(\rho; d_i; u; \tau)$), after operation 201, the current value $\rho$ is for example updated to a new current value $\rho$ resulting from the division of $(\rho+d_i \cdot u)$ by the complex number $\tau$.

In the operation 203 ($d_i \leftarrow u$), after operation 202, the intermediate value u is for example stored into digit $d_i$.

In an operation 204 (STOP CRITERION?), the cryptographic coprocessor 104 for example checks whether a stop criterion has been reached. If the stop criterion has not been reached (branch N), the current value i is updated, (bloc 205, i=i+1 mod m), to the value i+1 modulo m. The method then returns to the operation 201. In other words, if in operation 205 the current value i is less than or equal to m−2, then it is updated to i+1. However, if the current value i is equal to m−1, the rank i of the position is reset to zero. Thus, the algorithm loops on updating digits $d_0$ to $d_{m-1}$ one after another until the stop criterion is reached.

The stop criterion is for example based on the value of $\rho$ and on the index i. In one example, when the expected representation of the converted scalar k is the $\tau$NAF representation and the number of most significant digits is n=4, the stop criterion is for example:

$$\rho=0 \text{ or } (|\rho| \leq 2 \text{ and } i=m-1), \qquad \text{Math 5}$$

where $|\rho|$ is modulus of the value $\rho$ considered as a usual complex number.

Once the stop criterion has been reached (branch Y), the process for example ends in an operation 206 (END). At this stage, the values of the n most significant digits are still the initial values, for example zero. During the operation 206, the n last coefficients $(d_m, \ldots, d_{m+n-1})$ of the accumulator are for example set to the representation of current value $\rho$, for example by executing operations 201 to 203 for each of the n digits in order. The accumulator $(d_0, \ldots, d_{m+n-1})$ then for example provides the output data of the method, wherein the coefficients $d_0$ to $d_{m+3}$ represent the digits of the reduced and $\tau$-adic converted form of the scalar k:

$$k \equiv \sum_{i=0}^{m+n-1} d_i \tau^i [\tau^m - 1]. \qquad \text{Math 6}$$

In another example, we set n=0 and the method outputs the reduced scalar in a hybrid form by outputting both the coefficients $d_0$ to $d_{m+1}$ and the final value of $\rho$, so that $$k \equiv \rho + \sum_{i=0}^{m-1} d_i \tau^i [\tau^m - 1], \qquad \text{Math 7}$$

where the size of $\rho$ is relatively small, and bounded by the stop criterion. For example, when the expected representation of the converted scalar k is the $\tau$NAF representation and the number of most significant digits is n=4, $\rho$ has a modulus less than or equal to 2.

Figure 4:
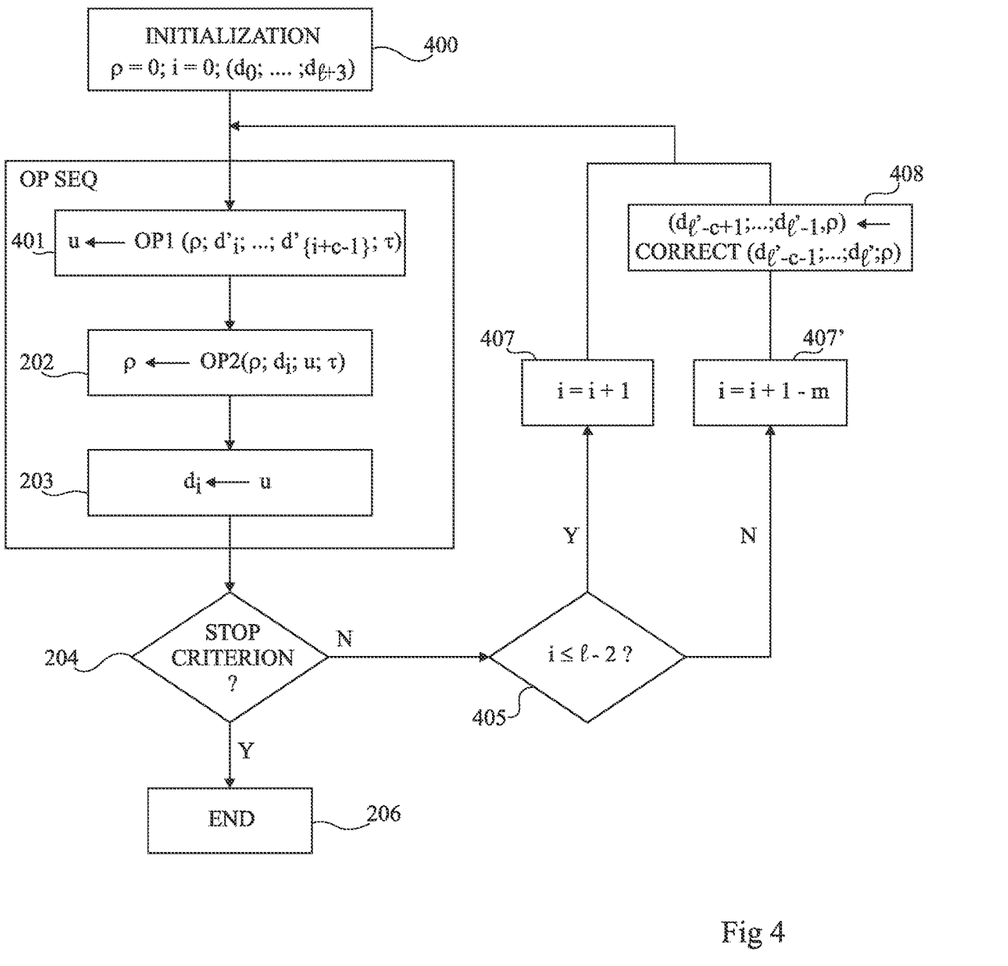
FIG. 4 is a flow diagram illustrating operations of a method of performing scalar conversion according to an embodiment.

FIG. 4 is another flowchart illustrating operation of a method of implementation of scalar conversion according to an embodiment. This method is for example implemented by the cryptographic coprocessor 104 of the electronic device 100.

The method of FIG. 4 has operations similar to those of the method of FIG. 2, and like operations have been labelled with like reference numerals.

A difference in the method of FIG. 4 with respect to the method of FIG. 2 is that the accumulator is a vector $(d_0, \ldots, d_{l+n-1})$ of length l+n, where l=m+l' is an integer greater than the integer m with l' being an integer greater than 0. To avoid confusion with the number 1, integer l will be represented as integer L in addition to being represented as integer L.

Furthermore, in the embodiment of FIG. 4, the output digits of the accumulator represent the digits of the scalar k after a $\tau$-adic reduction and conversion, where the reduction is deliberately not optimal. In other words, since the conversion is correct, the method outputs the $\tau$-adic representation of a $\tau$-adic integer $\rho$ such that $\rho = k \pmod{\tau^m - 1}$, but the reduction being not optimal means that $\rho$ is not necessarily the smallest $\tau$-adic integer respecting that equivalence.

In an operation 400 (INITIALIZATION $\rho=0$; i=0; $(d_0, \ldots, d_{l+n-1})$) a current value i is initialized, for example to zero. The vector $(d_0, \ldots, d_{l+n-1})$ is also initialized, for example to the $\tau$-adic representation of a multiple of $\tau^m - 1$.

Figure 5:
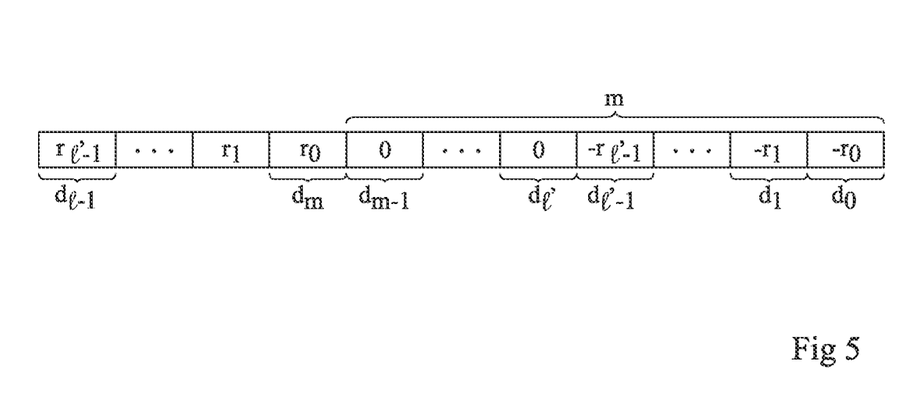
FIG. 5 illustrates an example of an initial state of an l-digit value used in the method of FIG. 4.

An example of initialization of the accumulator $(d_0, \ldots, d_{l+n-1})$ is illustrated in FIG. 5. This example is valid when the set of digits D is symmetric around 0, meaning that for any digit $d \in D$, its opposite −d also belongs to the set D.

In FIG. 5, only the l first coefficients $(d_0, \ldots, d_{l-1})$ of the accumulator are represented. The n last coefficients $(d_l, \ldots, d_{l+n-1})$ of the accumulator are for example initialized to zero and are only updated at the end of the algorithm of FIG. 4. Indeed, the n last coefficients $(d_l, \ldots, d_{l+n-1})$ are not provided as input data values in the iterations of the algorithm.

The l first coefficients $(d_0, d_l, \ldots, d_{l'-1}, d_{l'}, \ldots, d_{m-1}, d_m, \ldots, d_{l-1})$ of the accumulator are initialized to encode the digits of a random or pseudo-random multiple of $\tau^m - 1$ in $\tau$-adic form. Indeed, the multiplication of any point P of the considered Koblitz curve by the scalar k gives the same result as the multiplication of the point P by the scalar k added with a multiple of $\tau^m - 1$. In other words, for any point P belonging to Koblitz curve and for any integer or $\tau$-adic integer r $$k \cdot P = (k + r(\tau^m - 1)) \cdot P. \qquad \text{Math 8}$$

Adding a random multiple of $\tau^m - 1$ to the scalar k allows device 100 to perform the scalar multiplication using a pseudo-random multiplier, while maintaining the expected result for a multiplication by the scalar k. This makes attacks against the value of the scalar k by exploiting a power-consumption analysis of the value of the scalar k more difficult to succeed.

For this purpose, given l' random coefficients $(r_0, \ldots, r_{l'-1})$, for example with values in D, the value $r = \sum_{i=0}^{l'-1} r_i \tau^i$ represents a random $\tau$-adic integer. These l' coefficients $(r_0, \ldots, r_{l'-1})$ are then chosen to respect the predicate $C(d_i, \ldots, d_{i+c-1})$, for example if the output is expected in a $\tau$NAF, the product of two consecutive coefficients in $(r_0, \ldots, r_{l'-1})$ is null. Then, a multiple of r by $\tau^m - 1$ for example has the following $\tau$-adic form:

$$r(\tau^m - 1) = \sum_{i=0}^{l'-1} r_i \tau^{m+i} - \sum_{i=0}^{l'-1} r_i \tau^i. \qquad \text{Math 9}$$

Initializing the first l coefficients $(d_0, \ldots, d_{l-1})$ of the accumulator to encode a random multiple of $\tau^m - 1$ in $\tau$-adic form corresponds to choosing the value of l' digits $(r_0, \ldots, r_{l'-1})$ at random, for example belonging to D, and to setting:

$$d_j = -r_j \text{ and } d_{j+m} = r_j \text{ for } j \in \{0, \ldots, l'-1\} \text{ and}$$

$$d_j = 0 \text{ for } j \in \{l', \ldots, m-1\}. \qquad \text{Math 10}$$

After operation 400, the method illustrated in FIG. 4 continues with a sequence of operations (OP SEQ) 401, 202 and 203 where operations 202 and 203 are described above in relation to FIG. 2.

Operation 401 ($u \leftarrow OP1(\rho; d'_i, \ldots, d'_{i+c-1}; \tau)$) is similar to operation 201, except that digits $d'_i$ to $d'_{i+c-1}$ are an extract from the l lower digits of the accumulator ($d_0, \ldots, d_{l+n-1}$). If the index i is strictly smaller than l, then $d'_i = d_i$, otherwise $d'_i = d_{i-m}$.

After operation 203, the method continues with the verification operation 204, also described in relation to FIG. 2. In one example, if the stop criterion is not reached (branch N), another verification (bloc 405, i≤l−2?) is performed, for example by the cryptographic coprocessor 104. If the current value i is less than or equal to the value l−2 (branch Y), then the current value i is set to the value i+1 in an operation 407 (i=i+1). If the current value i is greater than the value l−1 (branch N), the current value i is set to the value i+1−m in an operation 407' (i=i+1−m), and a subsequent loop is started. After operation 407, the method for example returns to the operation 201.

After operation 407', an operation 408 (($d_{l'-c+1}, \ldots, d_{l'-1}, \rho$)←CORRECT($d_{l'-c+1}, \ldots, d_{l'}, \rho$)) is executed. Operation 408 conditionally modifies the c−1 digits of ($d_0, \ldots, d_{l-1}$) directly before index l', depending on the value of $\rho$. It consists in inputting ($d_{l'-c+1}, \ldots, d_{l'}, \rho$) to a function CORRECτ, described hereafter, and writing the vector that is output by the function into ($d_{l'-c+1}, \ldots, d_{l'-1}, \rho$). This optional correction is for example used when a predicate is to be verified by all groups of c consecutive digits. After operation 408, the method for example returns to operation 201.

The CORRECT function respects the three following properties:
(1) the value $\Sigma_{i=l'-c+1}^{l'-1} d_i \tau^i + \rho \tau l'$ is kept unchanged by the application of the function;
(2) the digits $d_i$ output by the function all belong to the set D;
(3) the digits $d_i$ and the new value of $\rho$ output by the function are such that the next execution of operations 201 to 203 generates a valid digit $d_{l'} \in D$, such that predicate C($d_{l'-c+1}, \ldots, d_{l'}$) holds.

In one example, the output of the algorithm is expected to be in the τNAF representation, which corresponds to D={−1,0,1}, c=2 and C($d_i, d_{i+1}$)⇔($d_i \times d_{i+1} = 0$), for all index i. In that case, function CORRECT for example returns ($d_{l'-1}, \rho$) unchanged when either $d_{l'} + \rho \equiv 0 (\mod \tau)$ or $d_{l'-1} = 0$, and returns $$\left(-d_{l'-1}, \rho + \frac{2}{\tau} d_{l'-1}\right)$$

otherwise.

Once the stop criterion has been reached, the process for example ends in the operation 206 (END). At this stage, the values of the n last coefficients of the accumulator are still the initial values, for example zero. During operation 206, the n last coefficients ($d_l, \ldots, d_{l+n-1}$) of the accumulator are for example set to the current value $\rho$, as already described in relation to FIG. 2. The output data of the method is the accumulator ($d_l, \ldots, d_{l+n-1}$), with coefficients $d_0$ to $d_{l+n-1}$ representing the digits of the reduced and τ-adic converted form of the value k:

$$k \equiv \Sigma_{i=0}^{l+3} d_i \tau^i \cdot [\tau^m - 1]. \qquad \text{Math 11}$$

In this embodiment, the coefficients $d_0$ to $d_{l'-c}$ are for example only taken once as input data values, and processed. Indeed, once each of the coefficients $d_0$ to $d_{l-1}$ has been provided as an input data value once, only the last m+c−1 coefficients ($d_{l'-c+1}, \ldots, d_{l-1}$) of the accumulator are taken as input data values, one after the other, in each new loop of the algorithm, until the stop criterion is reached.

The embodiments described in relation with FIGS. 2 and 4 allow to reduce and to convert the scalar k, or an equivalent of scalar k, into τ-adic representation, one digit after another, using a same sequence of operations, based on the equivalence of $\tau^i$ and $\tau^{i \bmod(m)}$ modulo $\tau^m - 1$.

The result of the method of FIG. 2 and/or of FIG. 4 can for example be used in the scalar multiplication of a point on a Koblitz curve, as will now be described in more detail with reference to FIG. 6. Such scalar multiplication can for example be used as part of elliptic-curve-cryptography operations.

Figure 6:
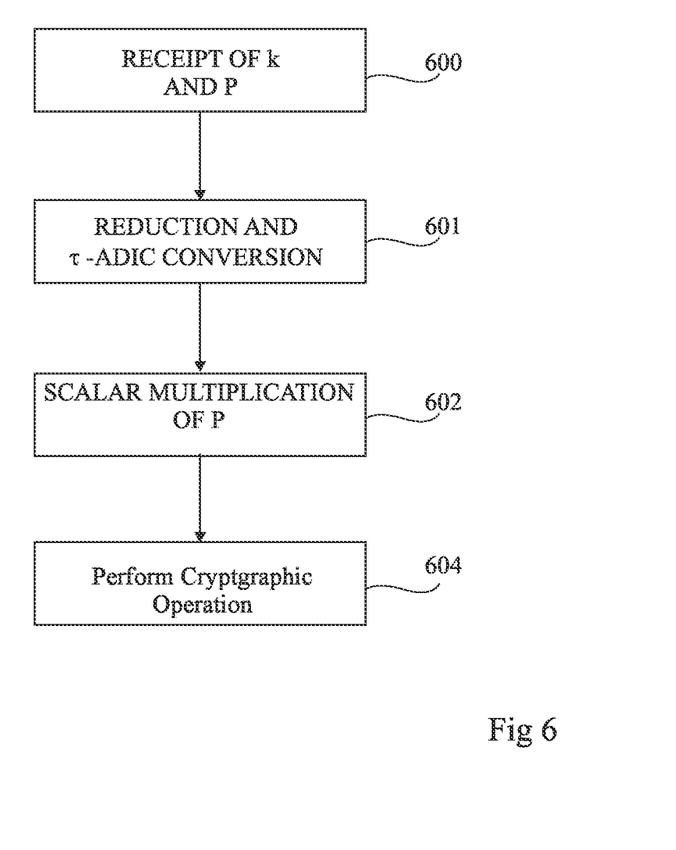
FIG. 6 is a flow diagram illustrating an example of a cryptographic method according to an embodiment of the present disclosure.

FIG. 6 illustrates an embodiment of performing a cryptographic operation and protecting the performing of the cryptographic operation. In particular, FIG. 6 is a flow diagram illustrating an example of a scalar multiplication according to an embodiment of the present disclosure.

For example, the method illustrated in the flow diagram of FIG. 6 is implemented by the electronic device 100 of FIG. 1.

For example, in an operation 600 (RECEIPT OF k AND P), the electronic device 100 receives, for example by the communication interface 110, data values corresponding to an integer or a τ-adic integer k and to encoded data or plaintext to be encoded. In another example, the scalar k is already stored in the memory 106 and only the point is received via the communication interface 110. The cryptographic key k and the point are then for example sent to the cryptographic coprocessor 104.

In an operation 601 (REDUCTION AND τ-ADIC CONVERSION), after operation 600, the cryptographic coprocessor 104 performs the reduction and conversion of the scalar k according to the embodiment described in relation with FIG. 2 or according to the embodiment described in relation with FIG. 4, in order to generate a more appropriate representation of scalar k.

In an operation 602 (SCALAR MULTIPLICATION OF P), after operation 601, the cryptographic coprocessor 104 for example performs the multiplication of the modified scalar k with the point P. The result of the operation is then used, for example in a cryptographic operation 604, according to the relevant protocols. In some cases, the multiplication is performed according to the method described in the patent application "Protection d'une opération cryptographique sur une courbe elliptique," in the name of the present applicant filed on 31 Aug. 2021 and assigned application number FR2109096.

An advantage of the described embodiments is that the τ-adic conversion may be made on the fly, one digit after another, during the scalar reduction. Moreover, the length of the converted scalar does not depend on the size of the input scalar.

Another advantage of the described embodiments is that they render it difficult to exploit differential power analysis and related attacks. Indeed, adding a random multiple of $\tau^m - 1$ to the scalar k at each cryptographic operation involving the scalar k changes the visible operation of the device. Moreover, in some τ-adic representations such as τNAF and variants thereof, generating random multiples of $\tau^m - 1$ comprises the generation of a number l' of random numbers.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, regarding the generation of the random digits.

A cryptographic method may be summarized as including the execution, by a cryptographic circuit (104), of an algorithm applied to a scalar (k) in order to generate an output vector, of length l+n, which digits are $d_0, \ldots, d_{l+n-1}$, the algorithm including iterations i, each iteration i taking an input data value ($\rho$), initially equal to said scalar and an input vector of length c, which digits are $d'_i, \ldots, d'_{i+c-1}$, where for each $j \in \{i, \ldots, i+c-1\}$, the digit $d'_j$ is such that $$d'_j = \begin{cases} d_j & \text{if } j < l \\ d_{j-m} & \text{otherwise} \end{cases},$$

where m is a positive integer and each iteration i including a) calculating a first intermediate data value (u) by a first operation applied, modulo $\tau$, to the first input data ($\rho$) and to the input vector, wherein $\tau$ is a complex number; b) updating the value of the first input data value ($\rho$) by a second operation applied to the first input data value, to the input vector, to the first intermediate data value (u), and to $\tau$; and c) updating the digit ($d_i$) at position i of the output vector equal to the first intermediate data value (u), wherein the total number of iterations is determined by the cryptographic circuit based on a stop criterion.

Each iteration may further include d) updating i to i+1; and e) when i=l, resetting i to i−m.

The first integer l may be greater than the second integer m, the method may further include, after execution of step e) of iteration l−1, the application of a function (CORRECT) to c−1 digits of the output vector (d0, ... dl+n−1) of position j, with j belonging to $\{l-m-c+1, \ldots, l-m\}$, together with the first input data value ($\rho$), and the updating of these digits of the output vector, as well as the first input data value ($\rho$), by the ones resulting of the application of the function, the function being such that a quantity equals to $\Sigma_{j=l-m-c+1}^{l-m} d_j \tau^j + \rho \tau^{l-m}$ remains the same before and after the updating of the digits by the function; and the updated digits $d_{l-m-c+1}$ to $d_{l-m}$ satisfy a predicate C, the predicate C depending on a base-$\tau$ representation.

Cryptographic method may include the setting of the n last coordinates of the output vector to a base-$\tau$ representation of the first input data value ($\rho$) of the last iteration.

The coordinates of the output vector $(d_0, \ldots, d_{l+n-1})$ may correspond to digits of the scalar (k) in a reduced $\tau$-adic form.

The length of the $\tau$-adic reduced conversion of the scalar (k) may not depend on the value of said scalar.

The stop criterion may include that the first input data value ($\rho$) is sufficiently low that it can be represented in n base-$\tau$ digits.

The result of the first operation may be a remainder, not necessarily minimal, of an Euclidean division of the sum of the first input data value ($\rho$) and the first digit of the input vector ($d'_i$) by the complex number ($\tau$).

The integer m may be defined according to a Koblitz curve (E) defined by a set of points of the following form:

$$\{(x,y) \in K \times K : y^2 + xy = x^3 + ax^2 + 1\} \qquad \text{Math 9}$$

where a is equal 0 or 1 and K=GF($2^m$) is a finite field of cardinality $2^m$.

Cryptographic method may include the scalar multiplication of a datum corresponding to a point P belonging to the Koblitz curve (E) by the scalar (k).

The complex number $\tau$ may be equal to $(\mu - i\sqrt{7})/2$, where $\mu$ is equal to $(-1)^{1-a}$.

The scalar (k) may be a cryptographic key stored in a memory of an electronic device.

The integer l may be equal to m and the output vector $(d_0, \ldots, d_{m+n-1})$ may be composed of a number of m+n coordinates, and, before execution of steps a) to c) of the first iteration i=0, each coordinate being equal to 0.

The first integer l may be greater than the second integer m and, before execution of step a) to c) of the first iteration i=0, the l first digits of the output vector $(d_0, \ldots, d_{l+n-1})$ may be the digits of a multiple of $\tau^m - 1$ in a $\tau$-adic form.

Before execution of steps a) to c) of the first iteration i=0, the l first digits the output vector $(d_0, \ldots, d_{l+n-1})$ are being such that the digit of position j, with j between 0 and l−m−1, may be the opposite of the digit of position m+j; and each digit of position j, with j between l−m and m−1, may be equal to 0.

Non-transitory memory may be summarized as including storing instructions for the implementation of the cryptographic method, when these instructions are executed by a cryptographic circuit.

Electronic device may be summarized as including a cryptographic circuit configured for the implementation of the cryptographic method.

In an embodiment, a method comprises performing a cryptographic operation, and protecting the performing of the cryptographic operation. The performing the cryptographic operation and the protecting including execution, by a cryptographic circuit, of an algorithm applied to a scalar to generate an output vector, of length l+n, having digits $d_0, \ldots, d_{l+n-1}$, the algorithm comprising a number of iterations i, each iteration i taking an input data value ($\rho$), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise} \end{cases},$$

where m, l and n are positive integers and each iteration i comprises:
a) calculating a first intermediate data value (u) by a first operation applied, modulo $\tau$, to the first input data ($\rho$) and to the input vector, wherein $\tau$ is a complex number;
b) updating the value of the first input data value ($\rho$) by a second operation applied to the first input data value, to the input vector, to the first intermediate data value (u), and to $\tau$; and
c) setting a digit ($d_i$) at position i of the output vector equal to the first intermediate data value (u), wherein the number of iterations is determined by the cryptographic circuit based on a stop criterion.

In an embodiment, each iteration comprises: d) updating i to i+1; and e) when i=l, resetting i to i−m. In an embodiment, the integer l is greater than the integer m, and the method comprises, after execution of step e) of iteration l−1, application of a function (CORRECT) to c−1 digits of the output vector (d0, ... dl+n−1) of position j, with j belonging to $\{l-m-c+1, \ldots, l-m\}$, together with the first input data value ($\rho$), and updating of these digits of the output vector, as well as the first input data value ($\rho$), by the ones resulting of the application of the function, the function being such that: a quantity equal to $\Sigma_{j=l-m-c+1}^{l-m} d_j \tau^j + \rho \tau^{l-m}$ remains the same before and after the updating of the digits by the function; and the updated digits $d_{l-m-c+1}$ to $d_{l-m}$ satisfy a predicate C, the predicate C depending on a base-$\tau$ representation. In an embodiment, the method comprises setting of an n last coordinates of the output vector to a base-$\tau$ representation of the first input data value ($\rho$) of the last iteration. In an embodiment, coordinates of the output vector ($d_0, \ldots, d_{l+n-1}$) correspond to digits of the scalar in a reduced $\tau$-adic form. In an embodiment, a length of a $\tau$-adic reduced conversion of the scalar does not depend on the value of said scalar. In an embodiment, the stop criterion is satisfied when the first input data value ($\rho$) can be represented in n base-r digits. In an embodiment, a result of the first operation is a remainder of an Euclidean division of the sum of the first input data value ($\rho$) and a first digit of the input vector (d'i) by the complex number ($\tau$). In an embodiment, the result of the first operation is not a minimal result of the Euclidean division. In an embodiment, the integer m is defined according to a Koblitz curve (E) defined by a set of points having a following form:

$$\{(x,y)\in K\times K : y^2+xy=x^3+ax^2+1\}$$

where a is equal 0 or 1 and $K=GF(2^m)$ is a finite field of cardinality $2^m$. In an embodiment, the method comprises scalar multiplication of a datum corresponding to a point P belonging to the Koblitz curve (E) by the scalar (k). In an embodiment, the complex number $\tau$ is equal to $(\mu-i\sqrt{7})/2$, where $\mu$ is equal to $(-1)^{1-a}$. In an embodiment, the scalar (k) is a cryptographic key stored in a memory of an electronic device. In an embodiment, the integer l is equal to m and the output vector ($d_0, \ldots, d_{m+n-1}$) is composed of a number of m+n coordinates, and, before execution of steps a) to c) of a first iteration i=0, each coordinate being equal to 0. In an embodiment, the integer l is greater than the integer m and wherein, before execution of step a) to c) of a first iteration i=0, l first digits of the output vector (d0, ..., dl+n-1) are digits of a multiple of $\tau^m-1$ in a $\tau$-adic form. In an embodiment, before execution of steps a) to c) of the first iteration i=0, the l first digits the output vector (d0, ..., dl+n-1) satisfy: a digit of position j, with j between 0 and l-m-1, is an opposite of a digit of position m+j; and each digit of position j, with j between l-m and m-1, is equal to 0.

In an embodiment, a non-transitory computer readable medium's contents cause a cryptographic circuit to perform a method, the method comprising: performing a cryptographic operation; and protecting the performing of the cryptographic operation. The performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value ($\rho$), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise} \end{cases},$$

where m, l and n are positive integers and each iteration i comprises:
a) calculating a first intermediate data value (u) by a first operation applied, modulo $\tau$, to the first input data ($\rho$) and to the input vector, wherein $\tau$ is a complex number;
b) updating the value of the first input data value ($\rho$) by a second operation applied to the first input data value, to the input vector, to the first intermediate data value (u), and to $\tau$; and
c) setting a digit ($d_i$) at position i of the output vector equal to the first intermediate data value (u), wherein the number of iterations is determined by the cryptographic circuit based on a stop criterion. In an embodiment, each iteration comprises: d) updating i to i+1; and e) when i=l, resetting i to i-m. In an embodiment, the integer l is greater than the integer m, and the method comprises, after execution of step e) of iteration l-1, application of a function (CORRECT) to c-1 digits of the output vector (d0, ... dl+n-1) of position j, with j belonging to {l-m-c+1, ..., l-m}, together with the first input data value ($\rho$), and updating of these digits of the output vector, as well as the first input data value ($\rho$), by the ones resulting of the application of the function, the function being such that: a quantity equal to $\Sigma_{j=l-m-c+1}^{l-m} d_j \tau^j + \rho \tau^{l-m}$ remains the same before and after the updating of the digits by the function; and the updated digits $d_{l-m-c+1}$ to $d_{l-m}$ satisfy a predicate C, the predicate C depending on a base-$\tau$ representation. In an embodiment, the method comprises setting of an n last coordinates of the output vector to a base-$\tau$ representation of the first input data value ($\rho$) of the last iteration. In an embodiment, the stop criterion is satisfied when the first input data value ($\rho$) can be represented in n base-$\tau$ digits. In an embodiment, a result of the first operation is a remainder of an Euclidean division of the sum of the first input data value ($\rho$) and a first digit of the input vector (d'i) by the complex number ($\tau$). In an embodiment, the integer m is defined according to a Koblitz curve (E) defined by a set of points having a following form:

$$\{(x,y)\in K\times K : y^2+xy=x^3+ax^2+1\}$$

where a is equal 0 or 1 and $K=GF(2^m)$ is a finite field of cardinality $2^m$. In an embodiment, the complex number $\tau$ is equal to $(\mu-i\sqrt{7})/2$, where $\mu$ is equal to $(-1)^{1-a}$. In an embodiment, the contents comprise instructions executable by the cryptographic circuit.

In an embodiment, a device comprises a memory and cryptographic circuitry coupled to the memory. The cryptographic circuitry, in operation, performs a cryptographic operation and protects the performing of the cryptographic operation, the performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value ($\rho$), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < l \\ d_{j-m} & \text{otherwise} \end{cases},$$

where m, l and n are positive integers and each iteration i comprises:
a) calculating a first intermediate data value (u) by a first operation applied, modulo $\tau$, to the first input data ($\rho$) and to the input vector, wherein $\tau$ is a complex number;
b) updating the value of the first input data value ($\rho$) by a second operation applied to the first input data value, to the input vector, to the first intermediate data value (u), and to $\tau$; and c) setting a digit ($d_i$) at position i of the output vector equal to the first intermediate data value (u), wherein the number of iterations is determined by the cryptographic circuit based on a stop criterion. In an embodiment, each iteration also comprises:

d) updating i to i+1; and e) when i=l, resetting i to i−m.

In an embodiment, the integer l is greater than the integer m, and the method comprises, after execution of step e) of iteration l−1, application of a function (CORRECT) to c−1 digits of the output vector (d0, . . . dl+n−1) of position j, with j belonging to {l−m−c+1, . . . , l−m}, together with the first input data value ($\rho$), and updating of these digits of the output vector, as well as the first input data value ($\rho$), by the ones resulting of the application of the function, the function being such that:

a quantity equal to $\Sigma_{j=l-m-c+1}^{l-m} d_j \tau^j + \rho \tau^{l-m}$ remains the same before and after the updating of the digits by the function; and the updated digits $d_{l-m-c+1}$ to $d_{l-m}$ satisfy a predicate C, the predicate C depending on a base-$\tau$ representation.

In an embodiment, the cryptographic circuitry, in operation, sets an n last coordinates of the output vector to a base-$\tau$ representation of the first input data value ($\rho$) of the last iteration. In an embodiment, the stop criterion is satisfied when the first input data value ($\rho$) can be represented in n base-$\tau$ digits. In an embodiment, a result of the first operation is a remainder of an Euclidean division of the sum of the first input data value ($\rho$) and a first digit of the input vector (d'i) by the complex number ($\tau$). In an embodiment, the integer m is defined according to a Koblitz curve (E) defined by a set of points having a following form:

$\{(x,y) \in K \times K : y^2 + xy = x^3 + ax^2 + 1\}$ where a is equal 0 or 1 and $K=GF(2^m)$ is a finite field of cardinality $2^m$. In an embodiment, the complex number $\tau$ is equal to $(\mu - i\sqrt{7})/2$, where $\mu$ is equal to $(-1)^{1-a}$.

In an embodiment, a system comprises a host processor and cryptographic circuitry coupled to the host processor. The cryptographic circuitry, in operation, performs a cryptographic operation and protects the performing of the cryptographic operation, the performing the cryptographic operation and the protecting including: executing an algorithm applied to a scalar to generate an output vector, of length l+n, having digits $d_0, \ldots, d_{l+n-1}$, the algorithm comprising a number of iterations i, each iteration i taking an input data value ($\rho$), initially equal to said scalar and an input vector of length c, having digits $d'_i, \ldots, d'_{i+c-1}$, where for each j ∈ {i, . . . , i+c−1}, the digit $d'_j$ is determined according to $$d'_j = \begin{cases} d_j & \text{if } j < l \\ d_{j-m} & \text{otherwise} \end{cases},$$

where m, l and n are positive integers and each iteration i comprises:

a) calculating a first intermediate data value (u) by a first operation applied, modulo $\tau$, to the first input data ($\rho$) and to the input vector, wherein $\tau$ is a complex number;

b) updating the value of the first input data value ($\rho$) by a second operation applied to the first input data value, to the input vector, to the first intermediate data value (u), and to $\tau$; and c) setting a digit ($d_i$) at position i of the output vector equal to the first intermediate data value (u), wherein the number of iterations is determined by the cryptographic circuit based on a stop criterion.

In an embodiment, each iteration also comprises:

d) updating i to i+1; and e) when i=l, resetting i to i−m.

In an embodiment, in operation, an application executing on the host processor initiates the performance of the cryptographic operation by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

performing a cryptographic operation; and protecting the performing of the cryptographic operation, the performing the cryptographic operation and the protecting including:

execution, by a cryptographic circuit, of an algorithm applied to a scalar to generate an output vector, of length L+n, having digits $d_0, \ldots, d_{l+n-1}$, the algorithm comprising a number of iterations i, each iteration i taking an input data value ($\rho$), initially equal to said scalar and an input vector of length c, having digits $d'_i, \ldots, d'_{i+c-1}$, where for each j ∈ {i, . . . , i+c−1}, the digit $d'_j$ is determined according to $$d'_j = \begin{cases} d_j & \text{if } j < L \\ d_{j-m} & \text{otherwise} \end{cases},$$

where m, L and n are positive integers and each iteration i comprises:
a) calculating a first intermediate data value (u) by a first operation applied, modulo, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d^i$) at position i of the output vector equal to the first intermediate data value (u),
wherein the number of iterations is determined by the cryptographic circuit based on a stop criterion and wherein coordinates of the output vector ($d_0, \ldots, d_{L+n-1}$) correspond to digits of the scalar in a reduced τ-adic form.

2. The method according to claim 1, wherein each iteration comprises:
d) updating i to i+1; and
e) when i=L, resetting i to i−m.

3. The method according to claim 2, wherein the integer L is greater than the integer m, the method comprising, after execution of step e) of iteration L−1, application of a function (CORRECT) to c-L digits of the output vector (d0, ... dL+n−1) of position j, with j belonging to {L−m−c+1, ..., L−m}, together with the first input data value ( ) and updating of these digits of the output vector, as well as the first input data value (ρ), by the ones resulting of the application of the function, the function being such that:
a quantity equal to $\sum_{j=L-m-c+1}^{L-m} d_j \tau^j + \rho \tau^{L-m}$ remains the same before and after the updating of the digits by the function; and
the updated digits $d_{L-m-c+1}$ to $d_{L-m}$ satisfy a predicate C, the predicate C depending on a base-τ representation.

4. The method according to claim 1, comprising setting of an n last coordinates of the output vector to a base-τ representation of the first input data value (ρ) of the last iteration.

5. The method according to claim 4, wherein a length of a τ-adic reduced conversion of the scalar does not depend on the value of said scalar.

6. The method according to claim 1, wherein the stop criterion is satisfied when the first input data value (ρ) can be represented in n base-τ digits.

7. The method according to claim 1, wherein a result of the first operation is a remainder of an Euclidean division of the sum of the first input data value (ρ) and a first digit of the input vector (d'i) by the complex number (τ).

8. The method according to claim 7, wherein the result of the first operation is not a minimal result of the Euclidean division.

9. The method according to claim 1, wherein the integer m is defined according to a Koblitz curve (E) defined by a set of points having a following form:

$$\{(x,y) \in K \times K : y^2 + xy = x^3 + ax^2 + 1\}$$

where a is equal 0 or 1 and K=GF($2^m$) is a finite field of cardinality $2^m$.

10. The method according to claim 9, comprising scalar multiplication of a datum corresponding to a point P belonging to the Koblitz curve (E) by the scalar (k).

11. The method according to claim 9, wherein the complex number τ is equal to $(\mu - i\sqrt{7})/2$, where μ is equal to $(-1)^{1-a}$.

12. The method according to claim 1, wherein the scalar (k) is a cryptographic key stored in a memory of an electronic device.

13. The method according to claim 1, wherein the integer L is equal to m and wherein the output vector ($d_0, \ldots, d_{m+n-1}$) is composed of a number of m+n coordinates, and, before execution of steps a) to c) of a first iteration i=0, each coordinate being equal to 0.

14. The method according to claim 1, wherein the integer L is greater than the integer m and wherein, before execution of step a) to c) of a first iteration i=0, L first digits of the output vector (d0, ..., dL+n−1) are digits of a multiple of $\tau^m-1$ in a τ-adic form.

15. The method according to claim 14, wherein, before execution of steps a) to c) of the first iteration i=0, the L first digits the output vector (d0, ..., dL+n−1) satisfy:
a digit of position j, with j between 0 and L−m−1, is an opposite of a digit of position m+j; and
each digit of position j, with j between L−m and m−1, is equal to 0.

16. A non-transitory computer readable medium having contents which cause a cryptographic circuit to perform a method, the method comprising:
performing a cryptographic operation; and
protecting the performing of the cryptographic operation, the performing the cryptographic operation and the protecting including:
executing an algorithm applied to a scalar to generate an output vector, of length L+n, having digits $d_0, \ldots, d_{L+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < L \\ d_{j-m} & \text{otherwise} \end{cases},$$

where m, L and n are positive integers and each iteration i comprises:
a) calculating a first intermediate data value (u) by a first operation applied, modulo, to the first input data (ρ) and to the input vector, wherein τ is a complex number;
b) updating the value of the first input data value (ρ) by a second operation applied to the first input data value, to the input vector, to the first intermediate data value (u), and to τ; and
c) setting a digit ($d_i$) at position i of the output vector equal to the first intermediate data value (u),
wherein the number of iterations is determined by the cryptographic circuit based on a stop criterion and wherein coordinates of the output vector ($d_0, \ldots, d_{L+n-1}$) correspond to digits of the scalar in a reduced τ-adic form.

17. The non-transitory computer readable medium of claim 16, wherein each iteration comprises:
d) updating i to i+1; and
e) when i=L, resetting i to i−m.

18. The non-transitory computer readable medium of claim 17, wherein the integer L is greater than the integer m, and the method comprises, after execution of step e) of iteration L−1, application of a function (CORRECT) to c−1 digits of the output vector (d0, . . . dL+n−1) of position j, with j belonging to {L−m−c+1, . . . , L−m}, together with the first input data value ( ) and updating of these digits of the output vector, as well as the first input data value (ρ), by the ones resulting of the application of the function, the function being such that:

a quantity equal to $\Sigma_{j=L-m-c+1}^{L-m} d_j \tau^j + \rho \tau^{L-m}$ remains the same before and after the updating of the digits by the function; and the updated digits $d_{L-m-c+1}$ to $d_{L-m}$ satisfy a predicate C, the predicate C depending on a base-τ representation.

19. The non-transitory computer readable medium according to claim 16, the method comprising setting of an n last coordinates of the output vector to a base-τ representation of the first input data value (ρ) of the last iteration.

20. The non-transitory computer readable medium according to claim 16, wherein the stop criterion is satisfied when the first input data value (ρ) can be represented in n base-τ digits.

21. The non-transitory computer readable medium according to claim 16, wherein a result of the first operation is a remainder of an Euclidean division of the sum of the first input data value (ρ) and a first digit of the input vector (d'i) by the complex number (τ).

22. The non-transitory computer readable medium according to claim 16, wherein the integer m is defined according to a Koblitz curve (E) defined by a set of points having a following form:

$$\{(x,y) \Sigma K \times K : y^2 + xy = x^3 + ax^2 + 1\}$$

where a is equal 0 or 1 and K=GF($2^m$) is a finite field of cardinality $2^m$.

23. The non-transitory computer readable medium according to claim 22, wherein the complex number τ is equal to $(\mu - i\sqrt{7})/2$, where u is equal to $(-1)^{1-a}$.

24. The non-transitory computer-readable medium of claim 16, wherein the contents comprise instructions executable by the cryptographic circuit.

25. A device, comprising:
a memory; and
cryptographic circuitry coupled to the memory, wherein the cryptographic circuitry, in operation, performs a cryptographic operation and protects the performing of the cryptographic operation, the performing the cryptographic operation and the protecting including:
executing an algorithm applied to a scalar to generate an output vector, of length L+n, having digits $d_0, \ldots, d_{L+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < L \\ d_{j-m} & \text{otherwise} \end{cases},$$

where m, L and n are positive integers and each iteration i comprises:
a) calculating a first intermediate data value (u) by a first operation applied, modulo, to the first input data (ρ) and to the input vector, wherein τ is a complex number;
b) updating the value of the first input data value (ρ) by a second operation applied to the first input data value, to the input vector, to the first intermediate data value (u), and to τ; and c) setting a digit ($d_i$) at position i of the output vector equal to the first intermediate data value (u),
wherein the number of iterations is determined by the cryptographic circuit based on a stop criterion and wherein coordinates of the output vector ($d_0, \ldots, d_{L+n-1}$) correspond to digits of the scalar in a reduced τ-adic form.

26. The device of claim 25, wherein each iteration comprises:
d) updating i to i+1; and
e) when i=L, resetting i to i−m.

27. The device of claim 26, wherein the integer L is greater than the integer m, and the method comprises, after execution of step e) of iteration L−1, application of a function (CORRECT) to c−1 digits of the output vector (d0, . . . dL+n−1) of position j, with j belonging to {L−m−c+1, . . . , L−m}, together with the first input data value ( ) and updating of these digits of the output vector, as well as the first input data value (ρ), by the ones resulting of the application of the function, the function being such that:

a quantity equal to $\Sigma_{j=L-m-c+1}^{L-m} d_j \tau^j + \rho \tau^{L-m}$ remains the same before and after the updating of the digits by the function; and the updated digits $d_{L-m-c+1}$ to $d_{L-m}$ satisfy a predicate C, the predicate C depending on a base-τ representation.

28. The device of claim 25, wherein the cryptographic circuitry, in operation, sets an n last coordinates of the output vector to a base-τ representation of the first input data value (ρ) of the last iteration.

29. The device of claim 25, wherein the stop criterion is satisfied when the first input data value (ρ) can be represented in n base-τ digits.

30. The device of claim 25, wherein a result of the first operation is a remainder of an Euclidean division of the sum of the first input data value (ρ) and a first digit of the input vector (d'i) by the complex number (τ).

31. The device of claim 25, wherein the integer m is defined according to a Koblitz curve (E) defined by a set of points having a following form:

$$\{(x,y) \in K \times K : y^2 + xy = x^3 + ax^2 + 1\}$$

where a is equal 0 or 1 and K=GF($2^m$) is a finite field of cardinality $2^m$.

32. The device of claim 31, wherein the complex number τ is equal to $(\mu - i\sqrt{7})/2$, where μ is equal to $(-1)^{1-a}$.

33. A system, comprising:
a host processor; and
cryptographic circuitry coupled to the host processor, wherein the cryptographic circuitry, in operation, performs a cryptographic operation and protects the performing of the cryptographic operation, the performing the cryptographic operation and the protecting including:
executing an algorithm applied to a scalar to generate an output vector, of length L+n, having digits $d_0, \ldots, d_{L+n-1}$, the algorithm comprising a number of iterations i, each iteration i taking an input data value (ρ), initially equal to said scalar and an input vector of length c, having digits $d'_i, \ldots, d'_{i+c-1}$, where for each $j \in \{i, \ldots, i+c-1\}$, the digit $d'_j$ is determined according to $$d'_j = \begin{cases} d_j & \text{if } j < L \\ d_{j-m} & \text{otherwise} \end{cases},$$

where m, L and n are positive integers and each iteration i comprises:

a) calculating a first intermediate data value (u) by a first operation applied, modulo, to the first input data (ρ) and to the input vector, wherein τ is a complex number;

b) updating the value of the first input data value (ρ) by a second operation applied to the first input data value, to the input vector, to the first intermediate data value (u), and to τ; and c) setting a digit ($d_i$) at position i of the output vector equal to the first intermediate data value (u), wherein the number of iterations is determined by the cryptographic circuit based on a stop criterion and wherein coordinates of the output vector ($d_0$, ..., $d_{L+n-1}$) correspond to digits of the scalar in a reduced τ-adic form.

34. The system of claim 33, wherein each iteration comprises:

d) updating i to i+1; and e) when i=L, resetting i to i−m.

35. The system of claim 33, wherein, in operation, an application executing on the host processor initiates the performance of the cryptographic operation by the cryptographic circuitry.

36. The system of claim 33, wherein the cryptographic operation is used to implement:

an encryption process;
a key-exchange process;
a key-agreement process;
a digital signature process;
an authentication process; or
combinations thereof.

37. The device of claim 25, wherein the cryptographic operation is used to implement:

an encryption process;
a key-exchange process;
a key-agreement process;
a digital signature process;
an authentication process; or
combinations thereof.

38. The method of claim 1, wherein the cryptographic operation is used to implement:

an encryption process;
a key-exchange process;
a key-agreement process;
a digital signature process;
an authentication process; or
combinations thereof.

* * * * *

UNITED STATES PATENT AND TRADEMARK OFFICE
CERTIFICATE OF CORRECTION

PATENT NO. : 12,284,279 B2
APPLICATION NO. : 17/981200
DATED : April 22, 2025
INVENTOR(S) : Guilhem Assael It is certified that error appears in the above-identified patent and that said Letters Patent is hereby corrected as shown below:

In the Claims

Column 17, Claim 1, Line 9:
"modulo," should read: --modulo τ,--.

Column 17, Claim 1, Line 9:
"(p)" should read: --(ρ)--.

Column 17, Claim 3, Line 30:
"(d0, . . . dL+n-1)" should read: --$(d_0, \ldots, d_{L+n-1})$--.

Column 17, Claim 3, Line 31:
"( )" should read: --(ρ),--.

Column 18, Claim 14, Line 15:
"(d0, . . ., dL+n-1)" should read: --$(d_0, \ldots, d_{L+n-1})$--.

Column 18, Claim 15, Line 19:
"(d0, . . ., dL+n-1)" should read: --$(d_0, \ldots, d_{L+n-1})$--.

Column 19, Claim 18, Line 1:
"(d0, . . ., dL+n-1)" should read: --$(d_0, \ldots, d_{L+n-1})$--.

Column 19, Claim 18, Line 3:
"( )" should read: --(ρ),--.

Column 19, Claim 23, Line 35:
"u" should read: --μ--.

Signed and Sealed this
Eighth Day of July, 2025

Coke Morgan Stewart
*Acting Director of the United States Patent and Trademark Office*

Column 20, Claim 27, Line 15:
"(d0, . . ., dL+n-1)" should read: --(d0, . . . , $d_{L+n-1}$)--.

Column 20, Claim 27, Line 16:
"( )" should read: --($\rho$),--.

Column 21, Claim 33, Line 2:
"modulo," should read: --modulo $\tau$,--.